United States Patent
Hwang et al.

(10) Patent No.: US 10,270,124 B2
(45) Date of Patent: Apr. 23, 2019

(54) LITHIUM SECONDARY BATTERY

(71) Applicant: SK INNOVATION CO., LTD., Seoul (KR)

(72) Inventors: Duck-Chul Hwang, Suwon-si (KR); Kyung-Bin Yoo, Daejeon (KR); Kook-Hyun Han, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 14/978,646

(22) Filed: Dec. 22, 2015

(65) Prior Publication Data

US 2016/0181599 A1   Jun. 23, 2016

(30) Foreign Application Priority Data

Dec. 22, 2014   (KR) .................. 10-2014-0186076

(51) Int. Cl.

| | |
|---|---|
| *H01M 10/0525* | (2010.01) |
| *H01M 4/525* | (2010.01) |
| *H01M 4/485* | (2010.01) |
| *H01M 4/505* | (2010.01) |
| *H01M 4/131* | (2010.01) |
| *H01M 4/133* | (2010.01) |
| *H01M 4/583* | (2010.01) |

(52) U.S. Cl.
CPC ....... *H01M 10/0525* (2013.01); *H01M 4/131* (2013.01); *H01M 4/133* (2013.01); *H01M 4/485* (2013.01); *H01M 4/505* (2013.01); *H01M 4/525* (2013.01); *H01M 4/583* (2013.01)

(58) Field of Classification Search
CPC ...... H01M 4/131; H01M 4/485; H01M 4/505; H01M 4/525; H01M 4/1391; H01M 10/052; H01M 10/0525
See application file for complete search history.

(56) References Cited

U.S. PATENT DOCUMENTS

| | | | |
|---|---|---|---|
| 2007/0254209 A1 | 11/2007 | Baba et al. | |
| 2009/0068561 A1* | 3/2009 | Sun .................. | H01M 4/131 429/223 |
| 2010/0015514 A1* | 1/2010 | Miyagi ............. | H01M 10/052 429/129 |

(Continued)

FOREIGN PATENT DOCUMENTS

| | | |
|---|---|---|
| KR | 1020060134631 | 12/2006 |
| KR | 1020140118517 A | 10/2014 |

(Continued)

*Primary Examiner* — Jimmy Vo (74) *Attorney, Agent, or Firm* — IP & T Group LLP (57) ABSTRACT

A lithium secondary battery including a cathode, an anode and a non-aqueous electrolyte. The cathode includes a cathode active material containing lithium-metal oxide of which at least one of metals has a concentration gradient region between a core part and a surface part thereof. The lithium-metal oxide includes elements M1, M2, and M3. M3 has a concentration gradient region with increased concentration between the core part and the surface part, M1 has a concentration gradient region with decreased concentration between the core part and the surface part, and M2 has a constant concentration from the core part and the surface part. The anode includes graphite having an average lattice distance d002 of 3.356 to 3.365 Å.

8 Claims, 3 Drawing Sheets

(56) References Cited

U.S. PATENT DOCUMENTS

| | | | |
|---|---|---|---|
| 2011/0052980 A1 | 3/2011 | Sakata et al. | |
| 2013/0260231 A1 | 10/2013 | Hua et al. | |
| 2014/0027670 A1 | 1/2014 | Sun et al. | |
| 2014/0087266 A1 | 3/2014 | Li et al. | |
| 2014/0158932 A1* | 6/2014 | Sun .................... | H01M 4/13 |
| | | | 252/182.1 |

FOREIGN PATENT DOCUMENTS

| | | | | |
|---|---|---|---|---|
| WO | 2012093797 A2 | 7/2012 | | |
| WO | WO 2013183974 A1 * | 12/2013 | .............. | H01M 4/13 |

* cited by examiner

LITHIUM SECONDARY BATTERY

CROSS-REFERENCE TO RELATED APPLICATIONS

This application claims priority to Korean Patent Application No. 10-2014-0186076 filed Dec. 22, 2014, the disclosure of which is hereby incorporated in its entirety by reference.

BACKGROUND OF THE INVENTION

Field of the Invention

The present invention relates to a lithium secondary battery, and more specifically, to a lithium secondary battery with excellent high-temperature storage and life-span properties.

Description of Related Art

With rapid progress of electronic, telecommunication and computer industries, portable electronic communication devices such as a camcorder, mobile phone, notebook PC, etc. have been remarkably developed. Accordingly, the demand for a lithium secondary battery as a power source capable of driving the above device is also increased. In particular, with regard to applications of eco-friendly power sources such as an electric car, uninterruptible power supply, electromotive tool and satellite, research and development have been actively proceeded in domestic field and other countries such as Japan, Europe, United States, etc.

Among currently used secondary batteries, the lithium secondary battery developed since early 1990's includes a cathode made of a carbon material capable of absorbing and desorbing lithium ions, an anode made of lithium-containing oxide, and a non-aqueous electrolyte containing lithium salt dissolved in a mixed organic solvent in a suitable amount.

In this regard, as the application of the lithium secondary battery is more enlarged, a case that the lithium secondary battery should be used even under more severe environments is increased.

However, lithium transition metal oxide or composite oxide used as a cathode active material of the lithium secondary battery entails a problem that a metal component is desorbed from the cathode during storage at a high temperature under fully charged condition, hence being in thermally unstable state.

In addition, when using a high-capacity cathode active material for a secondary battery with high energy density, the battery capacity may be increased, but life-span and high-temperature storage properties are decreased. Therefore, in order to prevent this phenomenon, a technique of using artificial graphite together with the cathode active material for the anode has been developed, there is still such a problem that an improvement width of the life-span and high-temperature storage properties is not large.

In order to solve the above problem, Korean Patent Laid-Open Publication No. 2006-0134631 discloses a cathode active material of core-shell structure having a core part and a shell part which are made of lithium transition metal oxides different from each other, however, still has lack of improvement in life-span and high-temperature storage properties.

SUMMARY OF THE INVENTION

Accordingly, it is an object of the present invention to provide a lithium secondary battery with excellent high-temperature storage and life-span properties.

The above object of the present invention will be achieved by the following characteristics:

(1) A lithium secondary battery, comprising a cathode, an anode and a non-aqueous electrolyte, wherein the cathode includes a cathode active material containing lithium-metal oxide of which at least one of metals has a concentration gradient region between a core part and a surface part thereof, and the anode includes graphite having an average lattice distance d002 of 3.356 to 3.365 Å.

(2) The lithium secondary battery according to the above (1), wherein another of the metals included in the lithium-metal oxide has a concentration gradient between the core part and the surface part.

(3) The lithium secondary battery according to the above (1), wherein the lithium-metal oxide includes a first metal having a concentration gradient region with increased concentration between the core part and the surface part, and a second metal having a concentration gradient region with decreased concentration between the core part and the surface part.

(4) The lithium secondary battery according to the above (1), wherein the lithium-metal oxide is represented by Formula 1 below, wherein at least one of M1, M2 and M3 has a concentration gradient region between the core part and the surface part:

$$Li_xM1_aM2_bM3_cO_y \qquad \text{[Formula 1]}$$

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0\leq a\leq1$, $0\leq b\leq1$, $0\leq c\leq1$, and $0<a+b+c\leq1$).

(5) The lithium secondary battery according to the above (4), wherein at least one of the M1, M2 and M3 has a concentration gradient region with increased concentration between the core part and the surface part, while the others have a concentration gradient region with decreased concentration between the core part and the surface part.

(6) The lithium secondary battery according to the above (4), wherein at least one of the M1, M2 and M3 has a concentration gradient region with increased concentration between the core part and the surface part, another has a concentration gradient region with decreased concentration between the core part and the surface part, and the other has a constant concentration between the core part and the surface part.

(7) The lithium secondary battery according to the above (4), wherein the M1, M2 and M3 are Ni, Co and Mn, respectively.

(8) The lithium secondary battery according to the above (4), wherein the M1 is Ni, and $0.6\leq a\leq0.95$ and $0.05\leq b+c\leq0.4$.

(9) The lithium secondary battery according to the above (4), wherein the M1 is Ni, and $0.7\leq a\leq0.9$ and $0.1\leq b+c\leq0.3$.

(10) The lithium secondary battery according to the above (1), wherein the lithium-metal oxide has a primary particle of a rod-type shape.

(11) The lithium secondary battery according to the above (1), wherein the graphite has an average lattice distance d002 of 3.361 to 3.365 Å.

(12) The lithium secondary battery according to the above (1), wherein the graphite is a mixture of a first graphite having an average lattice distance d002 of 3.356 to 3.360 Å, and a second graphite having an average lattice distance d002 of 3.361 to 3.365 Å.

(13) The lithium secondary battery according to the above (12), wherein a mixing weight ratio of the first graphite and the second graphite is 0:100 to 90:10.

(14) The lithium secondary battery according to the above (12), wherein the mixing weight ratio of the first graphite and the second graphite is 0:100 to 50:50.

The lithium secondary battery of the present invention uses a combination of the cathode active material containing the metal with a concentration gradient and the anode active material having a specific structure, such that it is possible to significantly improve both of the high-temperature storage and life-span properties.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention discloses a lithium secondary battery, including a cathode, an anode and a non-aqueous electrolyte, wherein the cathode includes a cathode active material containing lithium-metal oxide of which at least one of metals has a concentration gradient region between a core part and a surface part thereof, and the anode includes graphite having an average lattice distance d002 of 3.356 to 3.365 Å, thereby having excellent high-temperature storage and life-span properties. Hereinafter, exemplary embodiments of the present invention will be described in detail.

Cathode Active Material

The cathode active material according to the present invention includes lithium-metal oxide of which at least one of metals has a concentration gradient between a core part and a surface part thereof. Such a cathode active material exhibits superior life-span property, compared to a cathode active material without a change in concentration.

In the present invention, the fact that the metal of the lithium-metal oxide has a concentration gradient region between the core part and the surface part, means that other metals except for lithium may have a concentration distribution region varying in a constant tendency between a core part and a surface part of a lithium-metal oxide particle. The concentration distribution region (that is, concentration gradient region) may be positioned at any portion between the core part and the surface part, without particular limitation thereof. The constant tendency means that a development of concentration change is decreased or increased, however, does not exclude that a value opposed to the above tendency may be represent at a position.

In the present invention, the core part of the particle means an area within 0.1 μm radius from a center of the active material particle, while the surface part means an area within 0.1 μm from the outmost portion of the particle.

The cathode active material according to the present invention may include at least one of metals having a concentration gradient. Therefore, as one embodiment, the cathode active material may include a first metal having a concentration gradient region with increased concentration between the core part and the surface part, and a second metal having a concentration gradient region with decreased concentration between the core part and the surface part. The first metal or second metal may be independently at least one of metals.

A specific example of the cathode active material according to the present invention may include lithium-metal oxide represented by Formula 1 below, wherein at least one of M1, M2 and M3 has a concentration gradient between the core part and the surface part:

$$Li_xM1_aM2_bM3_cO_y$$ [Formula 1]

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B; and $0<x\leq1.1$, $2\leq y\leq2.02$, $0\leq a\leq1$, $0\leq b\leq1$, $0\leq c\leq1$, and $0<a+b+c\leq1$).

According to one embodiment of the present invention, at least one of M1, M2 and M3 may have a concentration gradient region with increased concentration between the core part and the surface part, while the others may have a concentration gradient region with decreased concentration between the core part and the surface part.

According to another embodiment of the present invention, at least one of M1, M2 and M3 may have a concentration gradient region with increased concentration between the core part and the surface part, another may have a concentration gradient region with decreased concentration between the core part and the surface part, and the other may have a constant concentration between the core part and the surface part.

According to a specific example of the present invention, M1, M2 and M3 may be Ni, Co and Mn, respectively.

The lithium-metal oxide according to the present invention may have a relatively higher content of Ni. Using Ni may be helpful for improving a capacity of the battery. For a structure of the conventional cathode active material, if a content of Ni is high, life-span is reduced. However, in a case of the cathode active material according to the present invention, the life-span property is not deteriorated even if it has a high content of Ni. Therefore, the cathode active material of the present invention may express excellent life-span property while maintaining a high capacity. For example, with regard to the lithium-metal oxide according to the present invention, a molar ratio of nickel may range from 0.6 to 0.95, and preferably, 0.7 to 0.9. That is, if M1 is Ni in the above Formula 1, it may be $0.6\leq a\leq0.95$ and $0.05\leq b+c\leq0.4$, and preferably, $0.7\leq a\leq0.9$ and $0.1\leq b+c\leq0.3$.

A particle shape of the lithium-metal oxide according to the present invention is not particularly limited, but a primary particle thereof preferably has a rod-type shape.

A particle size of the lithium-metal oxide according to the present invention is not particularly limited, and may be a range of 3 to 25 μm, for example.

The cathode active material according to the present invention may further include a coating layer on the above-described lithium-metal oxide. The coating layer may be made of a metal or metal oxide including, for example, Al, Ti, Ba, Zr, Si, B, Mg and P, and alloys thereof or oxides of the above metal.

As necessary, the cathode active material according to the present invention may include a configuration in which the above-described lithium-metal oxide is doped with a metal. Such a doping metal may include, for example, Al, Ti, Ba, Zr, Si, B, Mg, P, V, W, or the like, which may be used alone or in combination of two or more thereof.

The lithium-metal oxide according to the present invention may be prepared by co-precipitation.

Hereinafter, a method for preparing a cathode active material according to one embodiment of the present invention will be described.

First, a metal salt aqueous solution for forming a core part is prepared, and then, a metal salt aqueous solution for forming a surface part is prepared. Next, the metal salt aqueous solution for forming a core part is mixed with the metal salt aqueous solution for forming a surface part according to a required concentration gradient, and a chelating agent and an alkaline aqueous solution are mixed in a reactor, so as to prepare a precipitate having a concentration gradient of at least one metal element between the core part and the surface part. After the prepared precipitate is subjected to heat treatment, if it is mixed with a lithium salt and the mixture is again subjected to heat treatment, a cathode active material according to the present invention may be obtained.

Anode Active Material

The anode active material includes graphite having an average lattice distance d002 of 3.356 to 3.365 Å. When using the graphite having an average lattice distance d002 within a specific range as the anode active material together with the cathode active material of the present invention, the lithium secondary battery may have significantly improved life-span and high-temperature storage properties. In consideration of these aspects, it is preferable that the graphite has an average lattice distance d002 of 3.361 to 3.365 Å. If the average lattice distance d002 of the graphite is less than 3.356 Å, a graphite structure may not be formed, and if it exceeds 3.365 Å, the capacity of the battery may be decreased.

As necessary, according to the present invention, the graphite may be used as a mixture of a first graphite having an average lattice distance d002 of 3.356 to 3.360 Å, and a second graphite having an average lattice distance d002 of 3.361 to 3.365 Å. When using the graphite as such a mixture, it is preferable in an aspect of improving the life-span property. At this time, a mixing weight ratio of the first graphite and the second graphite is 0:100 to 90:10. When mixing the first graphite and the second graphite, it is more preferable that the mixing weight ration of the first graphite and the second graphite is 0:100 to 50:50 in an aspect of improving the life-span property. As a content of the second graphite is higher than that of the first graphite, improvement in life-span property is more increased.

A size of the graphite used in the present invention is not particularly limited, but may have an average particle diameter of 5 to 30 μm.

Secondary Battery

The present invention provides a lithium secondary battery fabricated using a cathode containing the above-described cathode active material, an anode containing the above-described anode active material, and the above-described non-aqueous electrolyte.

The cathode may be formed by adding a solvent and, optionally, a binder, conductive material, dispersant, etc. to the cathode active material, and agitating the same to prepare a cathode slurry, then applying (coating) the slurry to a collector made of a metal material, and drying and pressing the same.

The anode may be formed by adding a solvent and, optionally, a binder, conductive material, dispersant, etc. to the anode active material and agitating the same to prepare an anode negative slurry, applying the slurry to a collector made of a metal material (coating), drying and pressing the same.

The binder may include any one commonly used in the related art without particular limitation thereof. For example, an organic binder such as polyvinylidene fluoride-hexafluoropropylene copolymer (PVDF-co-HFP), polyvinylidene fluoride (PVDF), polyacrylonitrile, polymethyl methacrylate, etc.; or an aqueous binder such as styrene-butadiene rubber (SBR), etc., may be used together with a thickener such as carboxymethyl cellulose (CMC).

The conductive material may include any conductive carbon substance generally used in the related art without particular limitation thereof.

The collector made of a metal material is a metal having high conductivity and being easily attached with a mixture of the cathode or anode active material. The metal used herein may include any one if it does not have reactivity in the voltage range of the battery. A non-limited example of the cathode active material may include a foil made of aluminum, nickel, or a combination thereof. A non-limited example of the anode active material may include a foil made of copper, gold, nickel or a copper alloy, or a combination thereof.

A separator may be present between the cathode and the anode. Such a separator may be made of a conventional porous polymer film typically used as a separator in the related art, for example, a porous polymer film made of a polyolefin polymer such as ethylene homopolymer, propylene homopolymer, ethylene/butene copolymer, ethylene/hexene copolymer or ethylene/methacrylate copolymer, which may be used alone or as a laminate formed by stacking up the same. Otherwise, typical porous woven fabrics, for example, a woven fabric made of high-melting point glass fiber, polyethylene terephthalate fiber, etc., may be used, but it is not particularly limited thereto. The separator may be applied to a battery by any general method such as winding. Besides, lamination (stacking) and folding of the separator and the electrodes may also be used.

The non-aqueous electrolyte may include lithium salt which is an electrolyte and an organic solvent.

The lithium salt may include any one typically used for a lithium secondary battery electrolyte without particular limitation thereof, and may be represented by $Li^+X^-$.

Anions of such a lithium salt are not particularly limited, but may include for example, $F^-$, $Cl^-$, $Br^-$, $I^-$, $NO_3^-$, $N(CN)2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, which may be used alone or in combination of two or more thereof.

The organic solvent may include any one typically used for the lithium secondary battery electrolyte without particular limitation thereof. Representative examples may include any one selected from a group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, ethyl propionate, ethyl acetate, propyl acetate, dimethyl sulfoxide, acetonitrile, dimethoxyethane, diethoxyethane, sulforane, γ-butyrolactone and tetrahydrofurane, or a mixture of two or more thereof.

The non-aqueous electrolyte may optionally further include any at least one additive known in the related art without particular limitation thereof. For example, at least one of vinylene carbonate, propylene sulfite, propene sultone, propane sultone, etc. may be included, but it is not particularly limited thereto.

The above-described non-aqueous electrolyte for a lithium secondary of the present invention may be introduced into an electrode structure including a cathode, an anode, and a separator installed between the cathode and the anode, so as to fabricate a lithium secondary battery. An appearance of the lithium secondary battery of the present invention is not particularly limited, but may include, for example, a cylindrical or square form using a can, a pouch type or a coin type.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

<Cathode>

Lithium-metal oxide (hereinafter, CAM-10) with a whole composition of $LiNi_{0.80}Co_{0.10}Mn_{0.10}O_2$, a core part composition of $LiNi_{0.83}Co_{0.10}Mn_{0.07}O_2$ and a surface part composition of $LiNi_{0.78}Co_{0.10}Mn_{0.12}O_2$, having a concentration gradient region of nickel and manganese at a middle portion between the core part and the surface part as a cathode active material, Denka Black as a conductive material, and PVDF as a binder were used in a weight ratio of 92:5:3, respectively, to prepare a cathode slurry. Thereafter, the slurry was applied to an aluminum substrate to coat the same, followed by drying and pressing to prepare a cathode.

Figure 1:
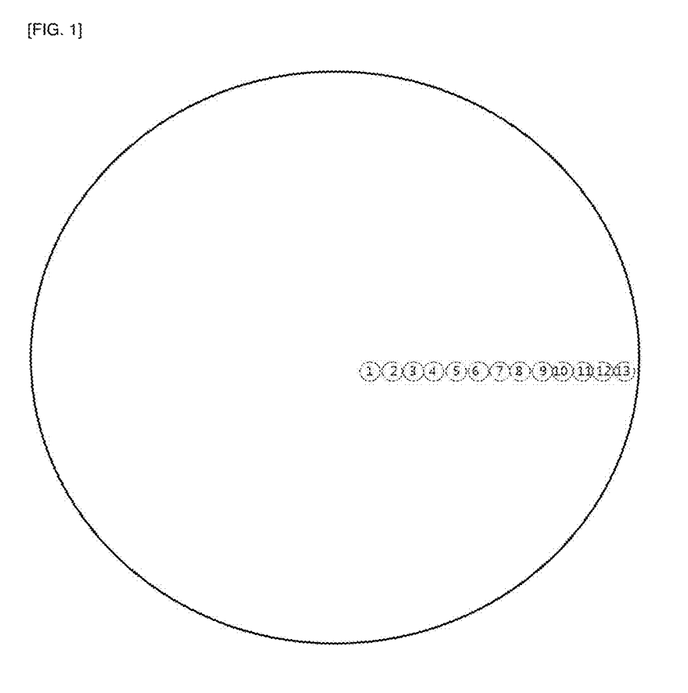
FIG. 1 is a view schematically illustrating a site of measuring a concentration of metal elements included in lithium-metal oxide according to an embodiment of the present invention.

For reference, the concentration gradient of the lithium-metal oxide used herein is listed in Table 1 below, and a measurement site of concentration is shown in FIG. 1. For the lithium-metal oxide particle with a distance between a core of a particle to the surface thereof, that is, 4.8 μm, the measurement sites were present at an interval of 0.4 μm from the core.

TABLE 1

| Site | Ni | Co | Mn |
|---|---|---|---|
| 1 | 0.830 | 0.100 | 0.070 |
| 2 | 0.831 | 0.101 | 0.068 |
| 3 | 0.829 | 0.100 | 0.071 |
| 4 | 0.830 | 0.100 | 0.070 |
| 5 | 0.800 | 0.099 | 0.101 |
| 6 | 0.780 | 0.100 | 0.120 |
| 7 | 0.780 | 0.100 | 0.120 |
| 8 | 0.780 | 0.101 | 0.119 |
| 9 | 0.781 | 0.100 | 0.119 |
| 10 | 0.779 | 0.101 | 0.120 |
| 11 | 0.780 | 0.100 | 0.120 |
| 12 | 0.781 | 0.099 | 0.120 |
| 13 | 0.780 | 0.100 | 0.120 |

<Anode>

An anode mixture including 93 wt. % of natural graphite (d002 3.358 Å) as an anode active material, 5 wt. % of a flake type conductive material, that is, KS6 as a conductive material, 1 wt. % of SBR as a binder, and 1 wt. % of CMC as a thickener was applied to a copper substrate, followed by drying and pressing to prepare an anode.

<Battery>

By notching both of a cathode plate and an anode plate in a suitable size, respectively, laminating the same, and installing a separator (polyethylene with a thickness of 25 μm) between the cathode plate and the anode plate, a cell was fabricated. Tap parts of the cathode and the anode were welded, respectively. A combination of the welded cathode/separator/anode was put into a pouch, followed by sealing three sides of the pouch except one side into which an electrolyte is injected. In this case, a portion having the tap is included in the sealing portion.

After injecting the electrolyte through the remaining one side, the one side was also sealed, followed by impregnation for 12 hours or more. The electrolyte used herein was formed by preparing 1M $LiPF_6$ solution with a mixed solvent of ethylene carbonate/ethyl methyl carbonate/dimethyl carbonate (25/45/30; volume ratio), and adding 1 wt. % of vinylene carbonate (VC), 0.5 wt. % of 1,3-propene sultone (PRS), and 0.5 wt. % of lithium bis(oxalato)borate (LiBOB) thereto.

After then, pre-charging was conducted with a current (2.5 A) corresponding to 0.25 C for 36 minutes. After 1 hour, degassing and then aging were conducted for 24 hours or more, followed by chemical charging-discharging (charge condition: CC-CV 0.2 C 4.2 V 0.05 C CUT-OFF; discharge condition: CC 0.2 C 2.5 V CUT-OFF). Thereafter, standard charging-discharging was conducted (charge condition: CC-CV 0.5 C 4.2 V 0.05 C CUT-OFF; discharge condition: CC 0.5 C 2.5 V CUT-OFF).

Examples 2 to 7

The same procedures as described in Example 1 were conducted except that natural graphite (d002 3.358 Å) and artificial graphite (d002 3.363 Å) with mixing weight ratios therebetween as listed in Table 3 below were used as an anode active material, to prepare batteries.

Example 8

<Cathode>

Lithium-metal oxide (hereinafter, CAM-20) with a whole composition of $LiNi_{0.80}Co_{0.10}Mn_{0.09}O_2$, a core part composition of $LiNi_{0.802}Co_{0.11}Mn_{0.088}O_2$ and a surface part composition of $LiNi_{0.77}Co_{0.11}Mn_{0.12}O_2$, having a concentration gradient region of nickel and manganese at a middle portion between the core part and the surface part as a cathode active material, Denka Black as a conductive material, and PVDF as a binder were used in a weight ratio of 92:5:3, respectively, to prepare a cathode slurry. Thereafter, the slurry was applied to an aluminum substrate to coat the same, followed by drying and pressing to prepare a cathode.

For reference, the concentration gradient of the lithium-metal oxide used herein is listed in Table 2 below, and a measurement site of concentration is shown in FIG. 1. For the lithium-metal oxide particle with a distance between a core of a particle to the surface thereof, that is, 4.8 μm, the measurement sites were present at an interval of 0.4 μm from the core.

TABLE 2

| Site | Ni | Co | Mn |
|---|---|---|---|
| 1 | 0.802 | 0.110 | 0.088 |
| 2 | 0.801 | 0.111 | 0.088 |

TABLE 2-continued

| Site | Ni | Co | Mn |
|------|-------|-------|-------|
| 3 | 0.802 | 0.110 | 0.088 |
| 4 | 0.802 | 0.110 | 0.088 |
| 5 | 0.803 | 0.111 | 0.086 |
| 6 | 0.802 | 0.110 | 0.088 |
| 7 | 0.802 | 0.110 | 0.088 |
| 8 | 0.802 | 0.109 | 0.089 |
| 9 | 0.801 | 0.110 | 0.089 |
| 10 | 0.802 | 0.110 | 0.088 |
| 11 | 0.802 | 0.108 | 0.090 |
| 12 | 0.800 | 0.110 | 0.090 |
| 13 | 0.770 | 0.110 | 0.120 |

The same procedures as described in Example 1 were conducted other than the procedures of preparing the cathode, to prepare an anode and a battery.

Examples 9 to 14

The same procedures as described in Example 8 were conducted except that natural graphite (d002 3.358 Å) and artificial graphite (d002 3.363 Å) with mixing weight ratios therebetween as listed in Table 3 below were used as an anode active material, to prepare batteries.

Example 15

The same procedures as described in Example 1 were conducted except that natural graphite (d002 3.356 Å) and artificial graphite (d002 3.363 Å) with a mixing weight ratio therebetween as listed in Table 3 below were used as an anode active material, to prepare a battery.

Example 16

The same procedures as described in Example 1 were conducted except that natural graphite (d002 3.360 Å) and artificial graphite (d002 3.363 Å) with a mixing weight ratio of 50:50 therebetween as listed in Table 3 below were used as an anode active material, to prepare a battery.

Example 17

The same procedures as described in Example 1 were conducted except that natural graphite (d002 3.358 Å) and artificial graphite (d002 3.361 Å) with a mixing weight ratio of 50:50 therebetween as listed in Table 3 below were used as an anode active material, to prepare a battery.

Example 18

The same procedures as described in Example 1 were conducted except that natural graphite (d002 3.358 Å) and artificial graphite (d002 3.365 Å) with a mixing weight ratio of 50:50 therebetween as listed in Table 3 below were used as an anode active material, to prepare a battery.

Comparative Example 1

The same procedures as described in Example 1 were conducted to fabricate a cell except that $LiNi_{0.8}Co_{0.1}Mn_{0.1}O_2$ (hereinafter, CAM-30) having a uniform composition throughout particles without a concentration gradient was used as a cathode active material, to prepare a battery.

Comparative Examples 2 to 7

The same procedures as described in Comparative Example 1 were conducted except that natural graphite (d002 3.358 Å) and artificial graphite (d002 3.363 Å) with mixing weight ratios therebetween as listed in Table 3 below were used as an anode active material, to prepare batteries.

Comparative Example 8

The same procedures as described in Example 1 were conducted except that artificial graphite (d002 3.370 Å) was used alone as an anode active material, to prepare a battery.

Comparative Example 9

The same procedures as described in Example 8 were conducted except that artificial graphite (d002 3.370 Å) was used alone as an anode active material, to prepare a battery.

Comparative Example 10

The same procedures as described in Comparative Example 1 were conducted except that artificial graphite (d002 3.370 Å) was used alone as an anode active material, to prepare a battery.

Experimental Example 1

1. Life-Span Property

After repeating the charging (CC-CV 2.0 C 4.2 V 0.05 C CUT-OFF) and discharging (CC 2.0 C 2.75 V CUT-OFF) with the cell prepared in each of the examples and comparative examples 500 times, the discharge capacity at 500 times was calculated in % to the discharge capacity at 1 time at room temperature. Results thereof are shown in Table 3 below.

2. High-Temperature Storage Property (Capacity Recovery Rate (%) after High-Temperature Storage for 4 Weeks)

After storing the cell charged under a condition of CC-CV 0.5 C 4.2 V 0.05 C CUT-OFF according to each of the examples and comparative example in an oven at 60° C. for 4 weeks, the cell was discharged under a condition of CC 0.5 C 2.75 V CUT-OFF, then, charged again under a condition of CC-CV 0.5 C 4.2 V 0.05 C CUT-OFF and discharged under a condition of CC 0.5 C 2.75 V CUT-OFF. This discharge amount was compared to a discharge amount at standard charging/discharging, thus measuring a capacity recovery rate. Results thereof are shown in Table 3 below.

TABLE 3

| Section | Cathode active material | Anode active material | | | Capacity recovery rate after high-temperature storage for 4 weeks (%) |
|---------|------|------|------|------|------|
| | | Type | Mixing weight ratio | Anode active material | |
| Example 1 | CAM-10 | Natural graphite (d002 3.358 Å)/ | 100/0 | 80 | 78 |

TABLE 3-continued

| Section | Cathode active material | Anode active material Type | Mixing weight ratio | Anode active material | Capacity recovery rate after high-temperature storage for 4 weeks (%) |
|---|---|---|---|---|---|
| Example 2 | CAM-10 | Natural graphite (d002 3.358 Å)/ Artificial graphite (d002 3.363 Å) | 90/10 | 82 | 81 |
| Example 3 | CAM-10 | Natural graphite (d002 3.358 Å)/ Artificial graphite (d002 3.363 Å) | 70/30 | 86 | 83 |
| Example 4 | CAM-10 | Natural graphite (d002 3.358 Å)/ Artificial graphite (d002 3.363 Å) | 50/50 | 88 | 85 |
| Example 5 | CAM-10 | Natural graphite (d002 3.358 Å)/ Artificial graphite (d002 3.363 Å) | 30/70 | 90 | 87 |
| Example 6 | CAM-10 | Natural graphite (d002 3.358 Å)/ Artificial graphite (d002 3.363 Å) | 10/90 | 92 | 89 |
| Example 7 | CAM-10 | Natural graphite (d002 3.358 Å)/ Artificial graphite (d002 3.363 Å) | 0/100 | 95 | 90 |
| Example 8 | CAM-20 | Natural graphite (d002 3.358 Å)/ Artificial graphite (d002 3.363 Å) | 100/0 | 81 | 77 |
| Example 9 | CAM-20 | Natural graphite (d002 3.358 Å)/ Artificial graphite (d002 3.363 Å) | 90/10 | 84 | 82 |
| Example 10 | CAM-20 | Natural graphite (d002 3.358 Å)/ Artificial graphite (d002 3.363 Å) | 70/30 | 88 | 84 |
| Example 11 | CAM-20 | Natural graphite (d002 3.358 Å)/ Artificial graphite (d002 3.363 Å) | 50/50 | 90 | 87 |
| Example 12 | CAM-20 | Natural graphite (d002 3.358 Å)/ Artificial graphite (d002 3.363 Å) | 30/70 | 92 | 88 |
| Example 13 | CAM-20 | Natural graphite (d002 3.358 Å)/ Artificial graphite (d002 3.363 Å) | 10/90 | 93 | 89 |
| Example 14 | CAM-20 | Natural graphite (d002 3.358 Å)/ Artificial graphite (d002 3.363 Å) | 0/100 | 96 | 90 |
| Example 15 | CAM-10 | Natural graphite (d002 3.356 Å)/ Artificial graphite (d002 3.363 Å) | 50/50 | 87 | 84 |
| Example 16 | CAM-10 | Natural graphite (d002 3.360 Å)/ Artificial graphite (d002 3.363 Å) | 50/50 | 89 | 86 |
| Example 17 | CAM-10 | Natural graphite (d002 3.358 Å)/ Artificial graphite (d002 3.361 Å) | 50/50 | 87 | 85 |
| Example 18 | CAM-10 | Natural graphite (d002 3.358 Å)/ Artificial graphite (d002 3.365 Å) | 50/50 | 90 | 86 |
| Comparative Example 1 | CAM-30 | Natural graphite (d002 3.358 Å)/ Artificial graphite (d002 3.363 Å) | 100/0 | 70 | 80 |

TABLE 3-continued

| Section | Cathode active material | Anode active material Type | Mixing weight ratio | Anode active material | Capacity recovery rate after high-temperature storage for 4 weeks (%) |
|---|---|---|---|---|---|
| Comparative Example 2 | CAM-30 | Natural graphite (d002 3.358 Å)/ Artificial graphite (d002 3.363 Å) | 90/10 | 71 | 81 |
| Comparative Example 3 | CAM-30 | Natural graphite (d002 3.358 Å)/ Artificial graphite (d002 3.363 Å) | 70/30 | 73 | 83 |
| Comparative Example 4 | CAM-30 | Natural graphite (d002 3.358 Å)/ Artificial graphite (d002 3.363 Å) | 50/50 | 75 | 85 |
| Comparative Example 5 | CAM-30 | Natural graphite (d002 3.358 Å)/ Artificial graphite (d002 3.363 Å) | 30/70 | 77 | 87 |
| Comparative Example 6 | CAM-30 | Natural graphite (d002 3.358 Å)/ Artificial graphite (d002 3.363 Å) | 10/90 | 79 | 89 |
| Comparative Example 7 | CAM-30 | Natural graphite (d002 3.358 Å)/ Artificial graphite (d002 3.363 Å) | 0/100 | 80 | 90 |
| Comparative Example 8 | CAM-10 | Natural graphite (d002 3.358 Å)/ Artificial graphite (d002 3.370 Å) | 0/100 | 97 | 90 |
| Comparative Example 9 | CAM-20 | Natural graphite (d002 3.358 Å)/ Artificial graphite (d002 3.370 Å) | 0/100 | 97 | 90 |
| Comparative Example 10 | CAM-30 | Natural graphite (d002 3.358 Å)/ Artificial graphite (d002 3.370 Å) | 0/100 | 83 | 90 |

Referring to the above Table 3, it can be seen that the batteries of the examples generally exhibit superior life-span and high-temperature storage properties, compared to those of the comparative examples.

Specifically, comparing Examples 1 to 7 and Examples 8 to 14 with Comparative Examples 1 to 7, it can be seen that, when using the cathode active material having the concentration gradient according to the present invention (Examples 1 to 7 and Examples 8 to 14), they exhibit the high-temperature storage properties equal or superior to those of the comparative examples, and have life-span properties superior to those of the case of using the cathode active material without the concentration gradient (Comparative Examples 1 to 7).

In addition, it can be seen that, when using the same cathode active material as each other (Examples 1 to 7, Examples 8 to 14, and Comparative Examples 1 to 7), the life-span and the high-temperature storage properties are improved, as a content of the artificial graphite is increased.

On the other hand, it could be seen that, in the case of Comparative Examples 8 to 10 having d002 beyond the range of the present invention, the life-span and the high-temperature storage properties were exhibited similar to the examples, but the capacity of the anode active materials was largely decreased by 320 mAh/g or less, such that a level difficult to be actually used as a battery was exhibited.

Figure 2:
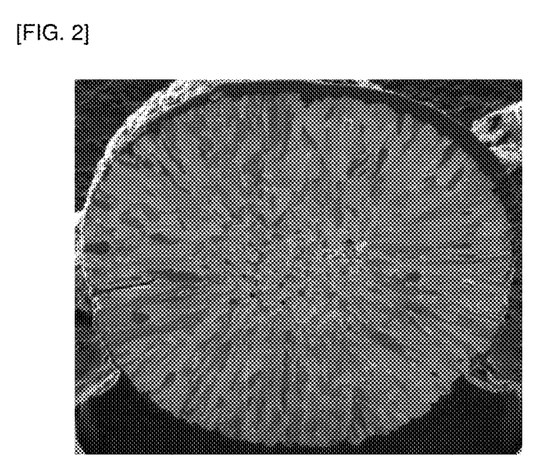
FIG. 2 is a photograph illustrating a cross section of a lithium-metal oxide according to Example 1.
Figure 3:
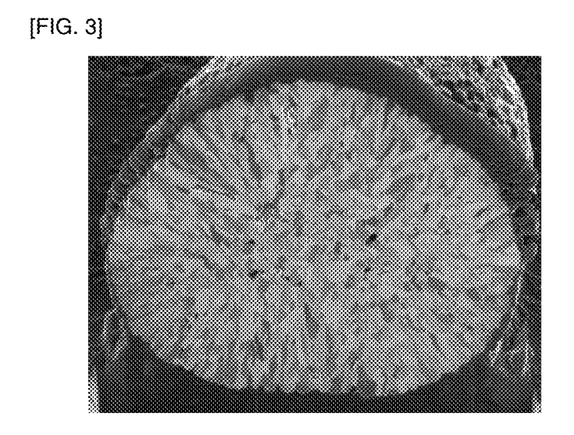
FIG. 3 is a photograph illustrating a cross section of a lithium-metal oxide according to Example 8.
Figure 4:
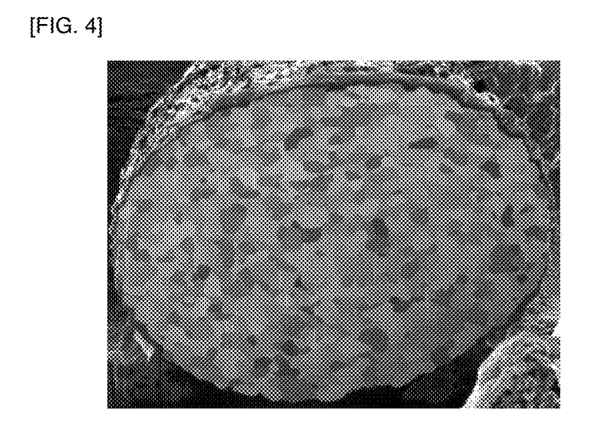
FIG. 4 is a photograph illustrating a cross section of a lithium-metal oxide according to Comparative Example 1.

FIGS. 2, 3 and 4 illustrate cross-sectional images of the cathode active materials used in Example 1, Example 8 and Comparative Example 1, respectively. Referring to FIGS. 2 and 3, it can be seen that the metal elements used for forming the cathode active materials prepared in Examples 1 and 8 have a concentration gradient, and the primary particles included in the cathode active materials have a rod-type shape. If the primary particle has such a rod-type structure, it is considered that life-span property may be more effectively improved.

The invention claimed is:

1. A lithium secondary battery, comprising a cathode, an anode and a non-aqueous electrolyte,
wherein the cathode includes a cathode active material containing lithium-metal oxide of which at least one of metals has a concentration gradient region between a core part and a surface part thereof, the lithium-metal oxide being represented by the following Formula 1, $$Li_xM1_aM2_bM3_cO_y$$ [Formula 1]

wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0<a<1$, $0<b<1$, $0<c<1$, and $0<a+b+c\leq1$ wherein M3 has a concentration gradient region with increased concentration between the core part and the surface part, M1 has a concentration gradient region with decreased concentration between the core part and the surface part, and M2 has a constant concentration between the core part and the surface part, and wherein the anode includes a mixture of a first graphite including natural graphite and having an average lattice distance d002 of 3.356 to 3.360 Å, and a second graphite including artificial graphite and having an average lattice distance d002 of 3.361 to 3.365 Å, and wherein a mixing weight ratio of the first graphite and the second graphite is 0:100 to 90:10.

2. The lithium secondary battery according to claim 1, wherein M1, M2 and M3 are Ni, Co and Mn, respectively.

3. The lithium secondary battery according to claim 1, wherein M1 is Ni, and $0.6 \leq a \leq 0.95$ and $0.05 \leq b+c \leq 0.4$.

4. The lithium secondary battery according to claim 1, wherein the M1 is Ni, and $0.7 \leq a \leq 0.9$ and $0.1 \leq b+c \leq 0.3$.

5. The lithium secondary battery according to claim 1, wherein the lithium-metal oxide has a primary particle of a rod-type shape.

6. The lithium secondary battery according to claim 1, wherein the graphite has an average lattice distance d002 of 3.361 to 3.365 Å.

7. The lithium secondary battery according to claim 1, wherein the mixing weight ratio of the first graphite and the second graphite is 0:100 to 50:50.

8. The lithium secondary battery according to claim 1, wherein the cathode active material includes a first constant concentration region between the core part and the concentration gradient region, and a second constant concentration region between the concentration gradient region and the surface part, wherein concentrations of M1 and M3 are constant at each of the core part, the first constant concentration region, the second constant concentration region, and the surface part.

* * * * *